United States Patent
Hirao et al.

(10) Patent No.: US 11,305,600 B2
(45) Date of Patent: Apr. 19, 2022

(54) VEHICLE BEHAVIOR CONTROL APPARATUS

(71) Applicant: HITACHI AUTOMOTIVE SYSTEMS, LTD., Ibaraki (JP)

(72) Inventors: Ryusuke Hirao, Kamagaya (JP); Nobuyuki Ichimaru, Yokohama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 447 days.

(21) Appl. No.: 16/485,916

(22) PCT Filed: Feb. 22, 2018

(86) PCT No.: PCT/JP2018/006404
§ 371 (c)(1),
(2) Date: Aug. 14, 2019

(87) PCT Pub. No.: WO2018/155541
PCT Pub. Date: Aug. 30, 2018

(65) Prior Publication Data
US 2020/0023705 A1    Jan. 23, 2020

(30) Foreign Application Priority Data
Feb. 24, 2017   (JP) .............................. JP2017-033353

(51) Int. Cl.
*B60G 17/0165*   (2006.01)
*F16F 9/50*   (2006.01)

(52) U.S. Cl.
CPC ............ *B60G 17/0165* (2013.01); *F16F 9/50* (2013.01); *B60G 2500/10* (2013.01)

(58) Field of Classification Search
None
See application file for complete search history.

(56) References Cited

U.S. PATENT DOCUMENTS 5,979,885 A * 11/1999 Katsuda ............. B60G 17/0165
                                                188/266.1
6,366,841 B1 * 4/2002 Ohsaku ............. B60G 17/0152
                                                280/5.5

(Continued)

FOREIGN PATENT DOCUMENTS

DE          43 16 177        7/2004
DE     10 2008 032 545       1/2010

(Continued)

OTHER PUBLICATIONS

International Search Report dated May 29, 2018 in corresponding International (PCT) Application No. PCT/JP2018/006404, with English translation.

(Continued)

*Primary Examiner* — Navid Ziaeianmehdizadeh
(74) *Attorney, Agent, or Firm* — Wenderoth, Lind & Ponack, L.L.P.

(57) ABSTRACT

A controller 10 as a generation mechanism control portion includes a base control portion 15 that determines a lower limit value on an instruction signal (i.e., a base instruction value) that serves as a lower limit on a force to be generated by a variable damper 6 (a force generation mechanism) according to at least a running speed of a vehicle. The base control portion 15 corrects the base instruction value by a base instruction value calculation portion 28 based on a result of a determination about a road surface output from a road surface determination portion 26 (i.e., a result of detection by a road surface state detection portion). A vehicle behavior control apparatus is configured to variably control a damping force characteristic of the variable damper 6 according to a road surface state with use of an instruction value output from the controller 10.

6 Claims, 7 Drawing Sheets

(56) References Cited

U.S. PATENT DOCUMENTS

| | | | | |
|---|---|---|---|---|
| 6,412,788 | B1* | 7/2002 | Ichimaru | B60G 17/0165 280/5.519 |
| 2004/0094912 | A1* | 5/2004 | Niwa | B60G 17/0165 280/5.518 |
| 2004/0128040 | A1 | 7/2004 | Stiller et al. | |
| 2015/0046035 | A1* | 2/2015 | Kikuchi | B60W 10/06 701/37 |
| 2017/0274724 | A1* | 9/2017 | Liu | B60G 17/0165 |

FOREIGN PATENT DOCUMENTS

| | | |
|---|---|---|
| DE | 101 20 918 | 5/2011 |
| JP | 5-238238 | 9/1993 |
| JP | 2009-107584 | 5/2009 |

OTHER PUBLICATIONS

Written Opinion of the International Searching Authority dated May 29, 2018 in corresponding International (PCT) Application No. PCT/JP2018/006404, with English translation.

Office Action dated Feb. 1, 2021 in corresponding German Application No. 11 2018 001 006.6 with English translation.

\* cited by examiner

VEHICLE BEHAVIOR CONTROL APPARATUS

TECHNICAL FIELD

The present invention relates to a vehicle behavior control apparatus that stabilizes a behavior of a vehicle body when, for example, a vehicle is running.

BACKGROUND ART

Generally, a vehicle such as a four-wheeled automobile is provided with suspension devices each including a damping force variable damper device between a vehicle body side and individual wheel sides (for example, refer to PTL 1). Such a suspension device according to the conventional technique is configured to control a damping force to be generated by the suspension based on information about a road surface lying ahead of the vehicle that is detected with use of, for example, a preview sensor, and prevent or reduce an unstable behavior when the vehicle is running.

CITATION LIST

Patent Literature

[PTL 1] Japanese Patent Application Public Disclosure No. HEI05-238238

SUMMARY OF INVENTION

Technical Problem

Then, a suspension control apparatus only detects the information about the road surface lying ahead of the vehicle with use of, for example, the preview sensor, and is not necessarily capable of sufficiently stabilizing the behavior when the vehicle is running.

An object of the present invention is to provide a vehicle behavior control apparatus configured to be able to stabilize the behavior of the vehicle body when the vehicle is running by controlling a force generation mechanism based on the information about the road surface lying ahead of the vehicle.

Solution to Problem

To achieve the above-described object, a configuration according to one aspect of the present invention is a vehicle behavior control apparatus including a force generation mechanism provided between a vehicle body side and a wheel side of a vehicle and configured to generate an adjustable force between these sides, a road surface state detection portion configured to be able to detect a road surface state ahead of the vehicle as a feedforward road surface state value, a vehicle body behavior information calculation portion configured to detect or estimate a state of a behavior of a vehicle body of the vehicle and calculate behavior information of the vehicle body as a feedback road surface state value, and a generation mechanism control portion configured to determine a value to be generated by the force generation mechanism based on the value of the vehicle body behavior information calculation portion and output an instruction signal therefor to the force generation mechanism. The generation mechanism control portion includes a base control portion configured to determine a lower limit value on the instruction signal. The lower limit value serves as a lower limit on the force to be generated by the force generation mechanism. The generation mechanism control portion corrects the lower limit value on the instruction signal that is determined by the base control portion based on a result of the detection by the road surface state detection portion.

According to the one aspect of the present invention, when determining that the vehicle will enter a wavy road based on the information from the road surface state detection portion (the feedforward road surface state value), the vehicle behavior control apparatus corrects the lower limit value on the instruction signal that serves as the lower limit on the force to be generated by the force generation mechanism (for example, a lower limit value defining the lowest instruction value, which is the lowest value of a damping force instruction), and, more specifically, sets the lower limit value to around zero by the base control portion before the vehicle enters the wavy road, thereby being able to reduce an excitation force and thus reduce a floating feeling.

DESCRIPTION OF EMBODIMENTS

In the following description, a vehicle behavior control apparatus according to an embodiment of the present invention will be described in detail with reference to the accompanying drawings based on an example in which this vehicle behavior control apparatus is employed for a four-wheeled automobile.

Figure 1:
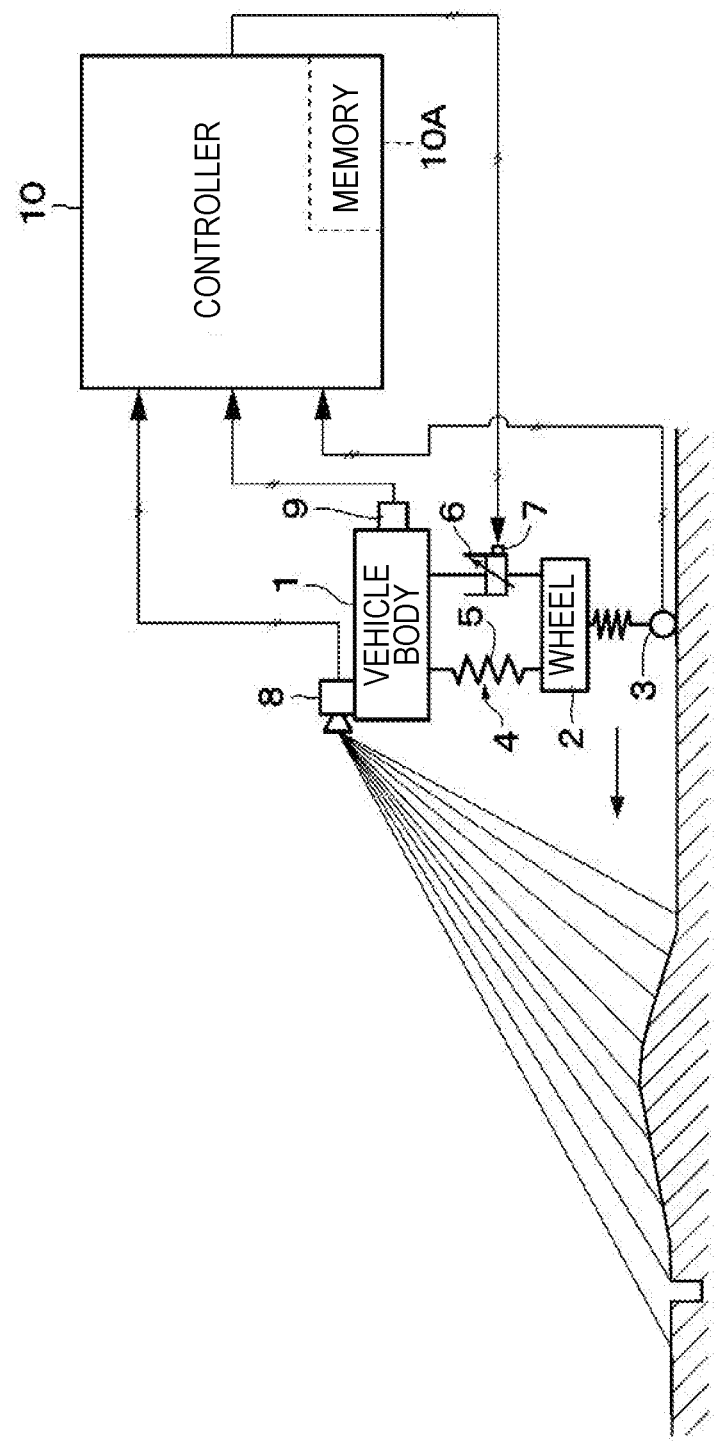
FIG. 1 illustrates an entire configuration of a vehicle behavior control apparatus according to an embodiment.

In FIG. 1, for example, left and right front wheels and left and right rear wheels (hereinafter collectively referred to as wheels 2) are mounted under a vehicle body 1 forming a main structure of a vehicle, and these wheels 2 each include a tire (not illustrated). This tire functions as a spring that absorbs fine roughness of a road surface. A vehicle speed sensor 3 detects, for example, the number of rotations of the wheel 2 (i.e., the tire), and outputs it as information about a vehicle speed (a running speed of the vehicle) to a controller 10, which will be described below.

A suspension device 4 is disposed between the vehicle body 1 and the wheel 2. This suspension device 4 includes a suspension spring 5 (hereinafter referred to as a spring 5), and a damping force adjustable shock absorber (hereinafter referred to as a variable damper 6) provided between the vehicle body 1 and the wheel 2 in a parallel relationship with this spring 5. FIG. 1 illustrates an example in a case where one set of the suspension device 4 is provided between the vehicle body 1 and the wheel 2. However, the suspension device 4 is supposed to be mounted in such a manner that four sets thereof in total are provided individually independently between the four wheels 2 and the vehicle body 1 in the case of the four-wheeled automobile, and FIG. 1 schematically illustrates only one set of them.

Now, the variable damper 6 of each of the suspension devices 4 is a force generation mechanism that generates an adjustable force between the vehicle body 1 side and the wheel 2 side, and is constructed with use of a damping force adjustable hydraulic shock absorber. This variable damper 6 is equipped with a damping force variable actuator 7 embodied by a damping force adjustment valve or the like for continuously adjusting a characteristic of a generated damping force (a damping force characteristic) from a hard characteristic (a high characteristic) to a soft characteristic (a low characteristic). The damping force variable actuator 7 does not necessarily have to be configured to continuously adjust the damping force characteristic, and may be configured to be able to adjust the damping force, for example, through a plurality of steps as many as two or more steps. Further, the variable damper 6 may be a pressure control-type damper or may be a flow rate control-type damper.

A camera device 8 forms a road surface state detection portion provided at a front portion of the vehicle body 1, and measures and detects a state of a road surface lying ahead of the vehicle (more specifically, including a distance and an angle to the road surface targeted for the detection, and a screen position and distance). This camera device 8 includes a pair of left and right image sensors (for example, digital cameras), and is configured to be able to detect the road surface state including a distance and an angle to an object targeted for imaging (the road surface located ahead of the vehicle) by capturing a pair of left and right images, as discussed in, for example, Japanese Patent Application Public Disclosure No. 2011-138244. Therefore, a preview image of the road surface lying ahead of the vehicle that is imaged by the camera device 8 (i.e., road surface preview information) is output to the controller 10, which will be described below, as a result of the detection by the road surface state detection portion. The camera device 8 can also be constructed with use of, for example, a stereo camera, a millimeter-wave radar and a monocular camera, or a plurality of millimeter-wave radars.

A vehicle height sensor 9 functions to detect a height of the vehicle body 1, and a plurality of vehicle height sensors 9 (for example, four sensors) is provided in correspondence with the individual wheels 2 on, for example, the vehicle body 1 side that is a sprung side. More specifically, each of the vehicle height sensors 9 detects a relative position (a height position) of the vehicle body 1 relative to each of the wheels 2, and outputs a detection signal therefrom to the controller 10, which will be described below. The vehicle height sensor 9 forms a vehicle body behavior information calculation portion that detects or estimates a state of a behavior of the vehicle body 1 of the vehicle and calculates behavior information of the vehicle body 1 as a feedback road surface state value. The sensor that detects the behavior of the vehicle can also be constructed with use of an acceleration sensor, a gyroscope sensor, or the like without being limited to the vehicle height sensor.

The controller 10 is a generation mechanism control portion that determines a force that should be generated by the variable damper 6 (the force generation mechanism) of the suspension device 4 and outputs an instruction signal therefor to the damping force adjustable actuator 7 of the suspension device 4, and is constructed with use of, for example, a microcomputer. This controller 10 is mounted on the vehicle body 1 side of the vehicle as a control device in charge of control of the behavior including control of a posture of the vehicle. The controller 10 functions to variably control the damping force that should be generated by the variable damper 6 according to an instruction value, which will be described below, based on the detection signal from the camera device 8 (the image signal including the road surface information) and the behavior information of the vehicle body 1 that is acquired from the vehicle height sensor 9.

To fulfill this function, an input side of the controller 10 is connected to the vehicle speed sensor 3, the vehicle height sensor 9, the camera device 8, and the like, and an output side of the controller 10 is connected to the damping force variable actuator 7 of the variable damper 6 and the like. Further, the controller 10 includes a memory 10A embodied by, for example, a ROM, a RAM, and/or a nonvolatile memory. This memory 10A stores therein a program for variably controlling the damping force that should be generated by the variable damper 6, and further stores therein, for example, the road surface preview information ahead of the vehicle that is imaged by the camera device 8 in an updatable manner.

Figure 2:
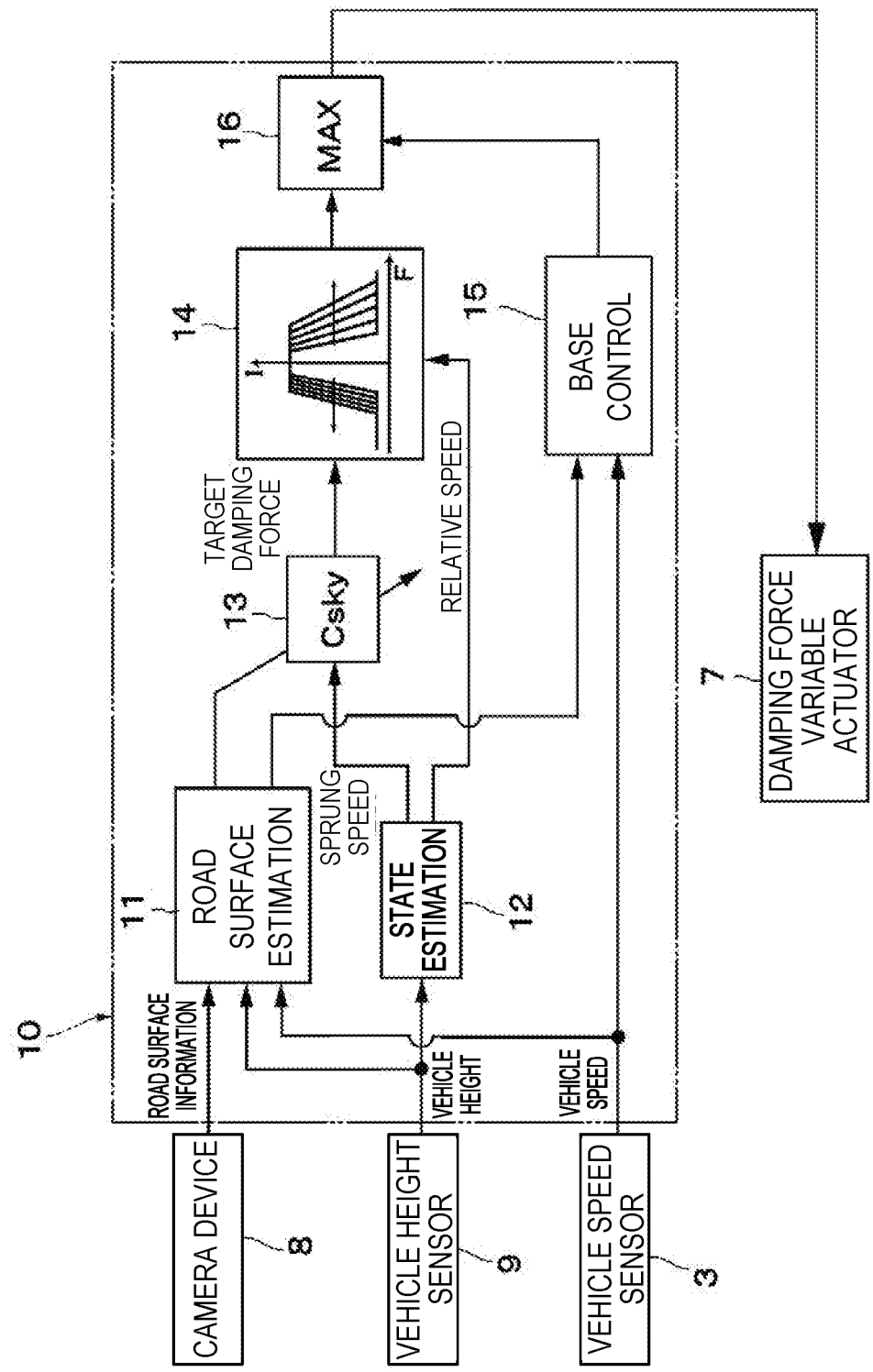
FIG. 2 is a control block diagram illustrating a specific example of control by a controller illustrated in FIG. 1.

Then, as illustrated in FIG. 2, the controller 10 includes a road surface estimation portion 11, a state estimation portion 12, a target damping force calculation portion 13, an instruction value calculation portion 14, a base control portion 15, and a maximum value calculation portion 16. As illustrated in, for example, FIG. 3, the road surface estimation portion 11 includes an ahead position setting portion 17 that sets a position of the road surface ahead of the vehicle according to the vehicle speed, a road surface selection portion 18, a first filter portion 19, a first waviness level calculation portion 20, a second filter portion 21, a second waviness level calculation portion 22, a maximum value calculation portion 23, a gain calculation portion 24, a pothole/protrusion detection portion 25, and a road surface determination portion 26.

Figure 3:
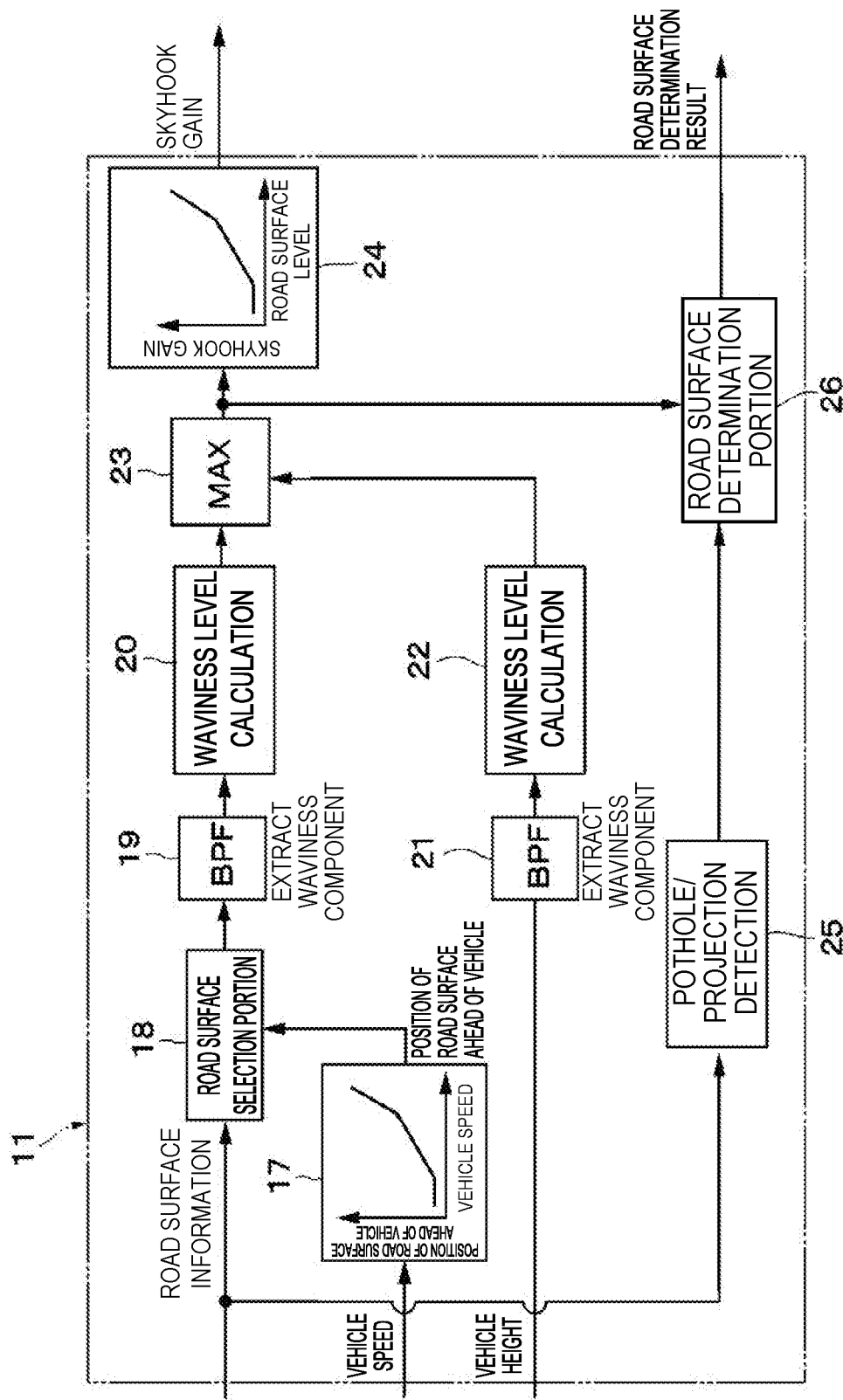
FIG. 3 is a control block diagram illustrating a specific example of control by a road surface estimation portion illustrated in FIG. 2.

The ahead position setting portion 17 of the road surface estimation portion 11 calculates the position of the road surface ahead of the vehicle according to the vehicle speed output from the vehicle speed sensor 3 based on a setting map illustrated in FIG. 3 as an example. The road surface selection portion 18 selectively introduces road surface information corresponding to the position of the road surface ahead of the vehicle that is calculated by the ahead position setting portion 17 from the road surface preview information (i.e., the preview information) ahead of the vehicle that is imaged from the camera device 8.

More specifically, the road surface preview information imaged by the camera device 8 includes profiles of a large number of road surface information pieces extending across a range capable of being previewed that is imaged by the camera (or the radar). Therefore, the road surface selection portion 18 selects road surface information at a relatively close position ahead of the vehicle when the vehicle speed is slow (for example, slower than 100 kilometers per hour) while selecting road surface information at a relatively distant position ahead of the vehicle when the vehicle speed is fast (for example, 100 kilometers per hour or faster) in consideration of a delay (a system processing time) of the control by the controller 10. As a result, the controller 10 can save a capacity of the memory 10A.

Next, the first filter portion 19 performs BPF (bandpass filter) processing for extracting a waviness component in a predetermined frequency band from the profile of the road surface information selected by the road surface selection portion 18. The first waviness level calculation portion 20 calculates a waviness level of the road surface (i.e., a feedforward road surface state value) from road surface information of the waviness component extracted by the first filter portion 19. The ahead position setting portion 17, the road surface selection portion 18, the first filter portion 19, and the first waviness level calculation portion 20 of the road surface estimation portion 11 form the road surface state detection portion that detects the road surface state ahead of the vehicle as the feedforward road surface state information value together with the camera device 8.

On the other hand, the second filter portion 21 performs BPF processing for extracting a waviness component in a predetermined frequency band from the detection signal of the vehicle height information detected by the vehicle height sensor 9. The second waviness level calculation portion 22 calculates a waviness level of the road surface from road surface information of the waviness component extracted by the second filter portion 21 (i.e., the feedback road surface state value). The second filter portion 21 and the second waviness level calculation portion 22 of the road surface estimation portion 11 form the vehicle body behavior information calculation portion that calculates the behavior information of the vehicle body 1 as the feedback road surface state value together with the vehicle height sensor 9.

Next, the maximum value calculation portion 23 compares the waviness level of the road surface calculated by the first waviness level calculation portion 20 (i.e., the feedforward road surface state value) and the waviness level of the road surface calculated by the second waviness level calculation portion 22 (i.e., the feedback road surface state value), and selects a state value corresponding to a higher waviness level as a road surface level. The gain calculation portion 24 calculates a skyhook gain as a gain (an amplification factor) based on the road surface level output from the maximum value calculation portion 23 according to a setting map illustrated in FIG. 3 as an example. The gain calculated by the gain calculation portion 24 (for example, a skyhook gain Csky illustrated in FIG. 2) reduces when the road surface level reduces, and increases so as to be gradually incremented as the road surface level increases.

The pothole/protrusion detection portion 25 of the road surface estimation portion 11 detects whether there is a pothole as a recessed portion or a protrusion as a bump portion on the road surface lying ahead of the vehicle from the road surface preview information imaged by the camera device 8. As will be used herein, the above-described pothole refers to a hole on an asphalt-paved road where a hole approximately 10 cm or more in depth is opened on the road surface due to peel-off of a part of the asphalt. The large protrusion also refers to, for example, a protrusion protruding as the bump portion from the road surface by approximately 10 cm or more.

Figure 4:
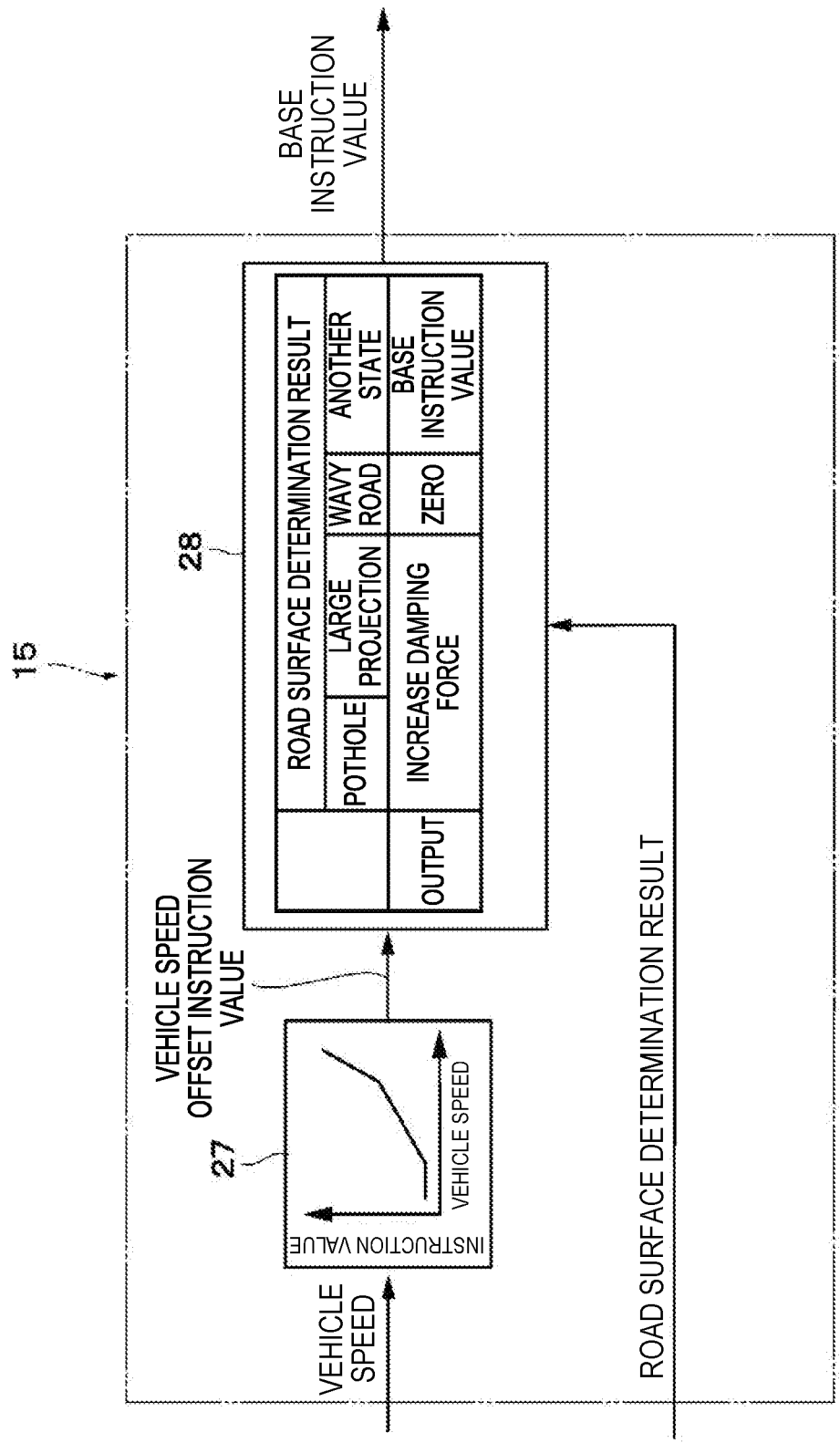
FIG. 4 is a control block diagram illustrating a specific example of control by a base control portion illustrated in FIG. 2.

Next, the road surface determination portion 26 determines the road surface from the information indicating the road surface level from the maximum value calculation portion 23 and the information from the pothole/protrusion detection portion 25, and outputs a result of the determination about the road surface to the base control portion 15. As illustrated in FIG. 4, the base control portion 15 includes a vehicle speed offset instruction value calculation portion 27 and a base instruction value calculation portion 28.

The vehicle speed offset instruction value calculation portion 27 calculates a vehicle speed offset instruction value according to the vehicle speed output from the vehicle speed sensor 3 based on a setting map illustrated in FIG. 4 as an example. The base instruction value calculation portion 28 calculates a base instruction value based on the information indicating the determination about the road surface corresponding to the vehicle speed offset instruction value calculated by the vehicle speed offset instruction value calculation portion 27 in the result of the determination about the road surface output from the road surface determination portion 26 according to a map in the form of a list table illustrated in FIG. 4 as an example.

The base instruction value in this case is subjected to a correction of increasing the damping force to damp a vibration and prevent the damper from reaching full extension or full compression when the result of the determination about the road surface indicates the above-described pothole or large protrusion. When the result of the determination about the road surface indicates a wavy road, the base instruction value for the damping force is set so as to establish the softest characteristic with the damping force adjusted to zero to reduce an excitation force. On the other hand, when the result of the determination about the road surface indicates none of the pothole, the large protrusion, and the wavy road (i.e., indicates another state), the above-described vehicle speed offset instruction value is directly output as the base instruction value. As a result, the vehicle behavior control apparatus can improve ride comfort on the wavy road, the pothole road, and the large protrusion road.

More specifically, the controller 10 (the generation mechanism control portion) includes the base control portion 15 as a base control portion that determines a lower limit value on the instruction signal (i.e., the base instruction value) that serves as a lower limit on the force to be generated by the variable damper 6 (the forge generation mechanism) according to at least the running speed of the vehicle. The lower limit value on the instruction signal is, for example, a lower limit value defining the lowest instruction value, which is the lowest value of the damping force instruction. The base control portion 15 is configured to correct the base instruction value by the base instruction value calculation portion 28 based on the result of the determination about the road surface output from the road surface determination portion 26 (i.e., the result of the detection by the road surface state detection portion) as indicated in the list table map illustrated in FIG. 4 as the example.

The state estimation portion 12 illustrated in FIG. 2 estimates and calculates a sprung speed and a relative speed from the vehicle height information acquired from the vehicle height sensor 9 as the feedback road surface state value. The vehicle height information is also a vertical displacement of the vehicle body 1, and the sprung speed of the vehicle body 1 and the relative speed between the vehicle body 1 and the wheel 2 can be calculated by differentiating this vehicle height information.

The target damping force calculation portion 13 illustrated in FIG. 2 calculates a target damping force as the force that should be generated by the variable damper 6 (the force generation mechanism) of the suspension device 4 by multiplying the above-described sprung speed from the state estimation portion 12 by the gain (for example, the skyhook gain Csky) calculated by the gain calculation portion 24 of the road surface estimation portion 11.

The instruction value calculation portion 14 includes an F-I map that variably sets a relationship between the targeted damping force F and a current value I according to the relative speed, as indicated in a characteristic map illustrated in FIG. 2. The instruction value calculation portion 14 functions to calculate an instruction value as a control current value that should be output to the damping force variable actuator 7 of the variable damper 6 based on the signal output from the target damping force calculation portion 13 (the signal indicating the target damping force) and the signal output from the state estimation portion 12 (the relative speed).

Next, the maximum value calculation portion 16 selects an instruction value corresponding to a larger value from the instruction value calculated by the instruction value calculation portion 14 and the base instruction value calculated by the base instruction value calculation portion 28 of the base control portion 15, and outputs the selected instruction value (the current) to the damping force variable actuator 7 of the variable damper 6. As a result, the damping force characteristic of the variable damper 6 is variably controlled continuously or in a stepwise manner through the plurality of steps between the hard side and the soft side according to the current (the instruction value) supplied to the damping force variable actuator 7.

The vehicle behavior control apparatus according to the present embodiment is configured in the above-described manner, and an operation thereof will be described next.

The camera device 8 mounted on the front portion of the vehicle body 1 can detect the road surface state lying ahead of the vehicle as the feedforward road surface state value by measuring the distance and the angle to the targeted road surface, the screen position and distance, and the like while imaging this road surface state as the road surface preview information. The vehicle height sensor 9, which detects the height of the vehicle body 1, can calculate the behavior information of the vehicle body 1 as the feedback road surface state value by detecting or estimating the state of the behavior (a displacement in a height direction) of the vehicle body 1 of the vehicle.

The controller 10 variably controls the damping force that should be generated by the variable damper 6 with use of the instruction value in the following manner, based on the vehicle speed information from the vehicle speed sensor 3, the detection signal from the camera device 8 (the feedforward road surface state value), and the behavior information of the vehicle body 1 from the vehicle height sensor 9 (the feedback road surface state value). That is, the road surface estimation portion 11 of the controller 10 determines the road surface (i.e., whether the road surface is the wavy road, the pothole road, or the large protrusion load) based on the above-described vehicle speed information, road surface preview information, and vehicle height information.

At this time, the maximum value calculation portion 23 of the road surface estimation portion 11 compares the waviness level of the road surface calculated by the first waviness level calculation portion 20 (i.e., the feedforward road surface state value) and the waviness level of the road surface calculated by the second waviness level calculation portion 22 (i.e., the feedback road surface state value), and selects the state value corresponding to the higher waviness level as the road surface level. The gain calculation portion 24 calculates the skyhook gain as the gain (the amplification factor) based on the road surface level output from the maximum value calculation portion 23 based on the setting map illustrated in FIG. 3 as the example.

In this manner, the road surface estimation portion 11 of the controller 10 calculates the waviness level according to the road surface preview information by the first waviness level calculation portion 20 and also calculates the waviness level according to the vehicle height information by the second waviness level calculation portion 22 at the same time, and selects the higher one of these waviness levels by the maximum value calculation portion 23. By this operation, the vehicle behavior control apparatus increases the skyhook gain since before the vehicle passes through the wavy road surface, and sets the high skyhook gain even after the vehicle passes through the wavy road surface until the waviness level according to the vehicle height information reduces. As a result, the vehicle behavior control apparatus can set the high gain since before the vehicle passes through the road surface until the vibration of the vehicle is stopped, across before the passage through the wavy road surface and after the passage through the wavy road surface.

The base control portion 15 of the controller 10 calculates the vehicle speed offset instruction value based on the vehicle speed according to the vehicle speed-instruction value map by the vehicle speed offset instruction value calculation portion 27 as illustrated in FIG. 4. Next, the base instruction value calculation portion 28 calculates the base instruction value based on the result of the determination about the road surface determined from the road surface preview information by the road surface determination portion 26 as indicated by the map in the form of the list table illustrated in FIG. 4 as the example.

By this calculation, the base instruction value is subjected to the correction of increasing the damping force to damp the vibration and prevent the damper from reaching the full extension or the full compression when the result of the determination about the road surface indicates the pothole or the large protrusion. When the result of the determination about the road surface indicates the wavy road, the base instruction value for the damping force can be set so as to establish the softest characteristic with the damping force adjusted to zero to reduce the excitation force. On the other hand, when the result of the determination about the road surface indicates another state (i.e., when the road surface state is none of the pothole, the large protrusion, and the wavy road), the above-described vehicle speed offset instruction value can be directly output as the base instruction value.

Figure 5:
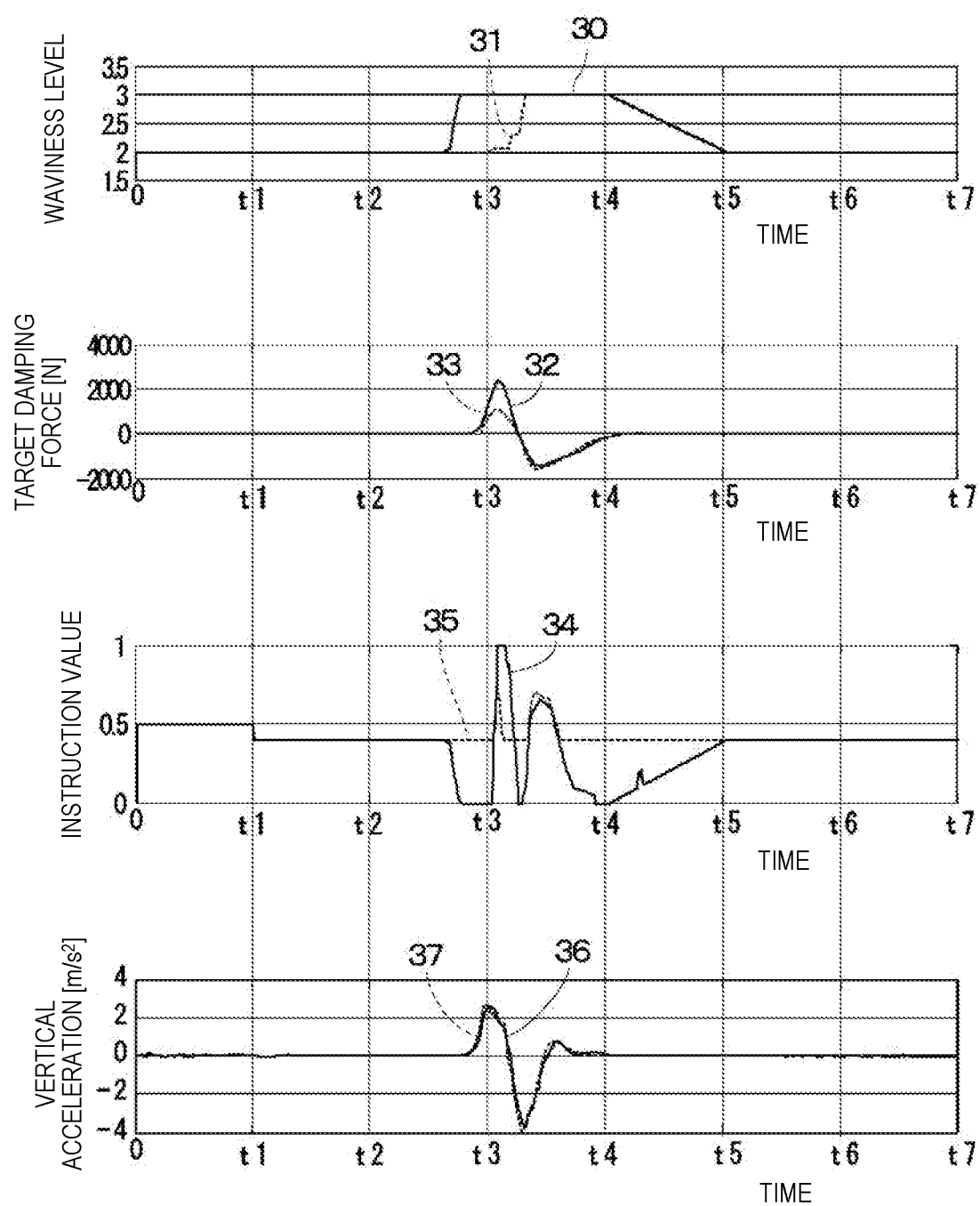
FIG. 5 illustrates characteristic lines indicating characteristics of a waviness level, a target damping force, an instruction value, and a vertical acceleration.

A characteristic line 30 indicated by a solid line in FIG. 5 is a result of acquiring, as test data, a characteristic of the waviness level of the vehicle to which the behavior control apparatus according to the present embodiment is applied. As also clearly understood from the characteristic line 30, the waviness level can be detected early, for example, at a time point before time t3, due to the road surface preview information from the camera device 8. On the other hand, a characteristic line 31 indicated by a dotted line in FIG. 5 is a characteristic of the waviness level according to the conventional technique, and the waviness level is detected at a further later time than time t3.

A characteristic line 32 indicated by a solid line in FIG. 5 is a result of acquiring a characteristic of the target damping force according to the present embodiment as test data. As also clearly understood from the characteristic line 32, the vehicle behavior control apparatus can set a higher control gain than a characteristic line 33 according to the conventional technique indicated by a dotted line, and can realize control so as to increase the target damping force as a requested damping force.

A characteristic line 34 indicated by a solid line in FIG. 5 is a result of acquiring, as test data, a characteristic of the instruction value (the current) output from the controller 10 to the damping force variable actuator 7 according to the present embodiment. By the control using the road surface preview information from the camera device 8, the vehicle behavior control apparatus reduces the instruction value (the current) in advance, for example, at the time point before time t3, sets the instruction value for the damping force to zero, which is the minimum value, before the vehicle enters the wavy road, and corrects the instruction value based on the result of the detection of the waviness level (the result of the detection by the road surface state detection portion). According to the present embodiment, the vehicle behavior control apparatus can set the control gain to a high gain so as to output a greater instruction value than a characteristic line 35 according to the conventional technique indicated by a dotted line, like the characteristic line 34 indicated by the solid line.

A characteristic line 36 indicated by a solid line illustrated in FIG. 5 is a result of acquiring a characteristic of the vertical acceleration according to the present embodiment as test data. In the present embodiment, as indicated by the characteristic line 36, the characteristic of the vertical acceleration is controlled so as to fall below a characteristic line 37 according to the conventional technique indicated by a dotted line. From these comparisons, it can be confirmed that the vehicle behavior control apparatus improves a damping performance of the variable damper 6.

In this manner, according to the present embodiment, the controller 10 as the generation mechanism control portion includes the base control portion 15 that determines the lower limit value on the instruction signal (i.e., the base instruction value) serving as the lower limit on the force to be generated by the variable damper 6 (the forge generation mechanism) according to at least the running speed of the vehicle. The base control portion 15 is configured to correct the base instruction value by the base instruction value calculation portion 28 based on the result of the determination about the road surface output from the road surface determination portion 26 (i.e., the result of the detection by the road surface state detection portion) as indicated in the list table map illustrated in FIG. 4 as the example.

Due to this configuration, the vehicle behavior control apparatus can set the hard characteristic by increasing the damping force so as to damp the vibration and prevent the damper from reaching the full extension or the full compression when the road surface state is the pothole or the large protrusion while the vehicle is running, while setting the soft characteristic by reducing the damping force so as to reduce the excitation force when the road surface state is the wavy road. In another case, the vehicle behavior control apparatus outputs the vehicle speed offset instruction value as the lower limit value on the instruction signal. Therefore, even when the road surface on which the vehicle is running is any of the wavy road, the pothole road, or the large protrusion road, the vehicle behavior control apparatus can variably control the damping force characteristic of the variable damper 6 according to the road surface state, thereby improving the ride comfort on the vehicle.

The controller 10 is configured to, for example, determine whether the road surface state is the wavy road from the road surface preview information and the vehicle speed by the road surface estimation portion 11 and set a high gain for the control of the ride comfort and the control for reducing the stroke before the vehicle passes through the wavy road. As a result, the vehicle behavior control apparatus can, for example, exert the damping effect from the beginning when the vehicle passes through the wavy road, thereby improving the damping performance.

Next, the base instruction value calculation portion 28 calculates the base instruction value based on the result of the determination about the road surface determined from the road surface preview information by the road surface determination portion 26 as indicated by the map in the form of the list table illustrated in FIG. 4 as the example. Due to this configuration, the vehicle behavior control apparatus can set the minimum value of the damping force instruction to zero before the vehicle enters the wavy road based on the wavy road level determined from the road surface preview information, thereby setting the base instruction value of the damping force so as to establish the softest characteristic. As a result, the vehicle behavior control apparatus becomes able to reduce the excitation force by the variable damper 6 and reduce a floating feeling when the vehicle is running on the wavy road.

The maximum value calculation portion 23 of the road surface estimation portion 11 is configured to compare the waviness level of the road surface calculated by the first waviness level calculation portion 20 (the feedforward road surface state value) and the waviness level of the road surface calculated by the second waviness level calculation portion 22 (the feedback road surface state value), and select the state value corresponding to the higher waviness level as the road surface level. As a result, the vehicle behavior control apparatus can reliably determine the road surface state since before the vehicle passes through the road surface until a timing when the vibration is stopped, thereby improving the ride comfort performance.

Further, the vehicle behavior control apparatus can detect the pothole or the large protrusion existing ahead of the road surface on which the vehicle is running based on the road surface preview information acquired from the camera device 8, and can absorb impact by increasing the damping force in advance since before the passage.

In the above-described embodiment, the vehicle behavior control apparatus has been described assuming that, for example, the wavy road or the like is determined based on the road surface preview information acquired from the camera device 8 by way of example. However, the present invention is not limited thereto, and the vehicle behavior control apparatus may determine the wavy road or the like with use of, for example, the following configurations (1) to (3). (1). The vehicle behavior control apparatus conducts a simulation of running on the road surface twenty times as fast as real time corresponding to a predetermined time (corresponding to one running event during a sampling time per which the road surface data is updated), and an acceleration simulation at a real-time speed or higher allows the vehicle behavior control apparatus to compensate for, for example, the delay due to the filter processing by the first and second filter portions 19 and 21. (2). The vehicle behavior control apparatus may be configured to determine whether the road surface state is the wavy road based on a displacement of the road surface and a speed of a change in the road surface. (3). The vehicle behavior control apparatus may be configured to calculate a frequency characteristic by FFT (fast Fourier transform) and determine the wavy road according to a value of a gain around sprung resonance for the determination about whether the road surface state is the wavy road.

Further, in the above-described embodiment, the vehicle behavior control apparatus has been described as setting the gain of the skyhook control for damping the sprung vibration so as to increase it when the road surface state is the wavy road. However, the present invention is not limited thereto, and the vehicle behavior control apparatus may be configured to employ, for example, hyperbolic optimization control, model prediction control, or the like instead of skyhook, and set a gain thereof so as to increase it. Further, when the road surface has a high amplitude, the damper further highly likely reaches the full extension, and therefore the vehicle behavior control apparatus may be configured to set a high gain as the gain for the stroke reduction control when the waviness level is extremely great.

Further, in the above-described embodiment, the vehicle behavior control apparatus has been described assuming that the base instruction value is the vehicle speed offset instruction value set according to the vehicle speed. However, the present invention is not limited thereto, and the vehicle behavior control apparatus may be configured to employ a method of setting the offset instruction value according to a mode SW (for example, normal, comfort, sport, and economy) for setting a control mode of the vehicle instead of the vehicle speed or may be configured to set the offset instruction value according to the vehicle speed and the state of the mode SW as indicated by a first modification illustrated in FIG. 6. In the first modification illustrated in FIG. 6, a base control portion 41 includes a vehicle speed offset instruction value calculation portion 42 and the base instruction value calculation portion 28. The base control portion 41 is configured approximately similarly to the base control portion 15 described in the above-described embodiment, but is different therefrom in terms of including the vehicle speed offset instruction value calculation portion 42.

Figure 6:
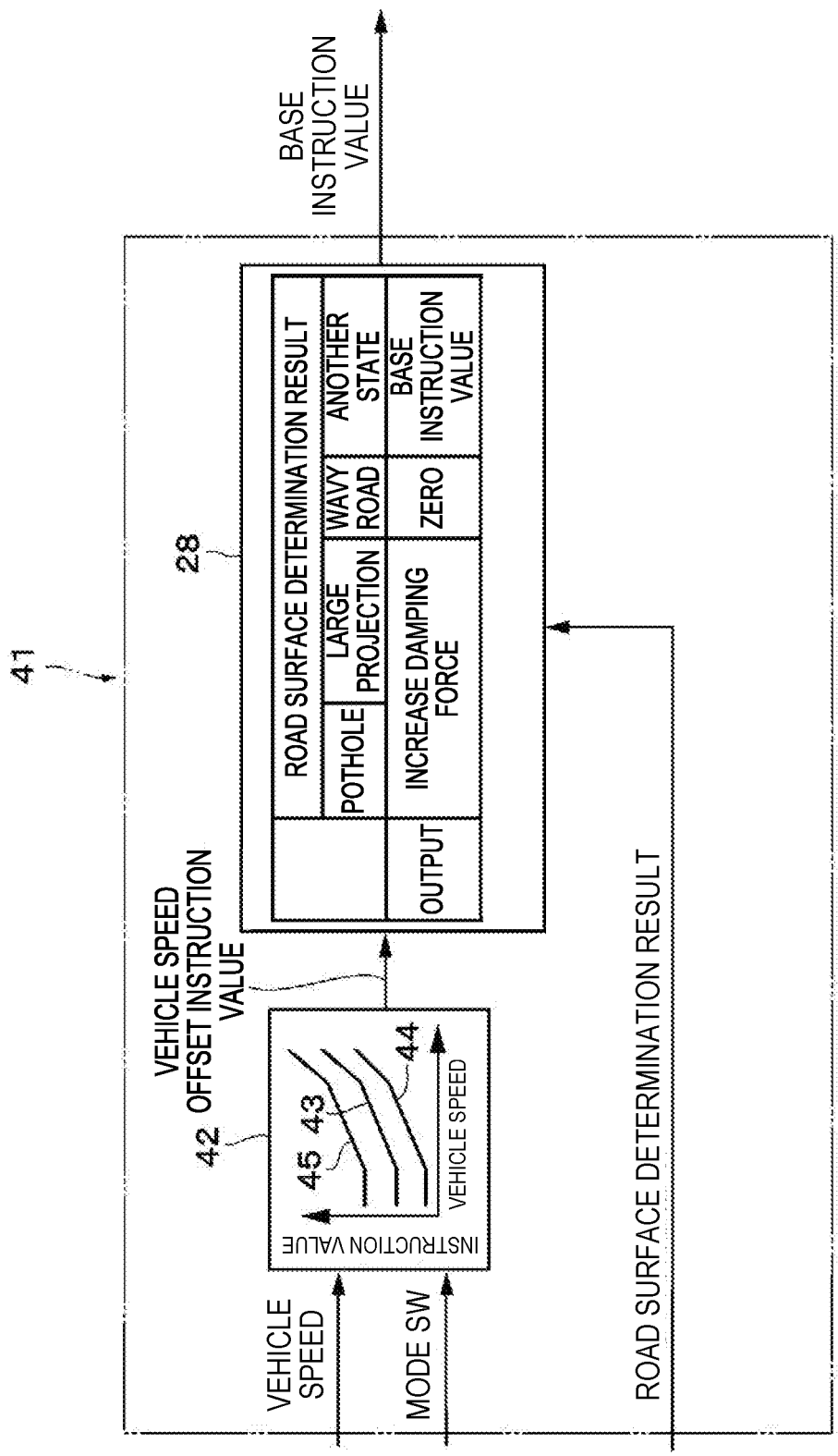
FIG. 6 is a control block diagram illustrating a specific example of control by a base control portion according to a first modification.

The vehicle speed offset instruction value calculation portion 42 calculates the vehicle speed offset instruction value according to a selection signal from the mode SW (not illustrated) for setting the control mode of the vehicle to, for example, any of normal, comfort, and sport, and the vehicle speed output from the vehicle speed sensor 3 based on a setting map including a characteristic line 43 (normal control), a characteristic line 44 (comfort control), and a characteristic line 45 (sport control) illustrated in FIG. 6 as an example. The base instruction value calculation portion 28 calculates the base instruction value based on the information indicating the determination about the road surface corresponding to the vehicle speed offset instruction value calculated by the vehicle speed offset instruction value calculation portion 42 in the result of the determination about the road surface output from the road surface determination portion 26 based on a map in the form of a list table illustrated in FIG. 6 as an example.

Figure 7:
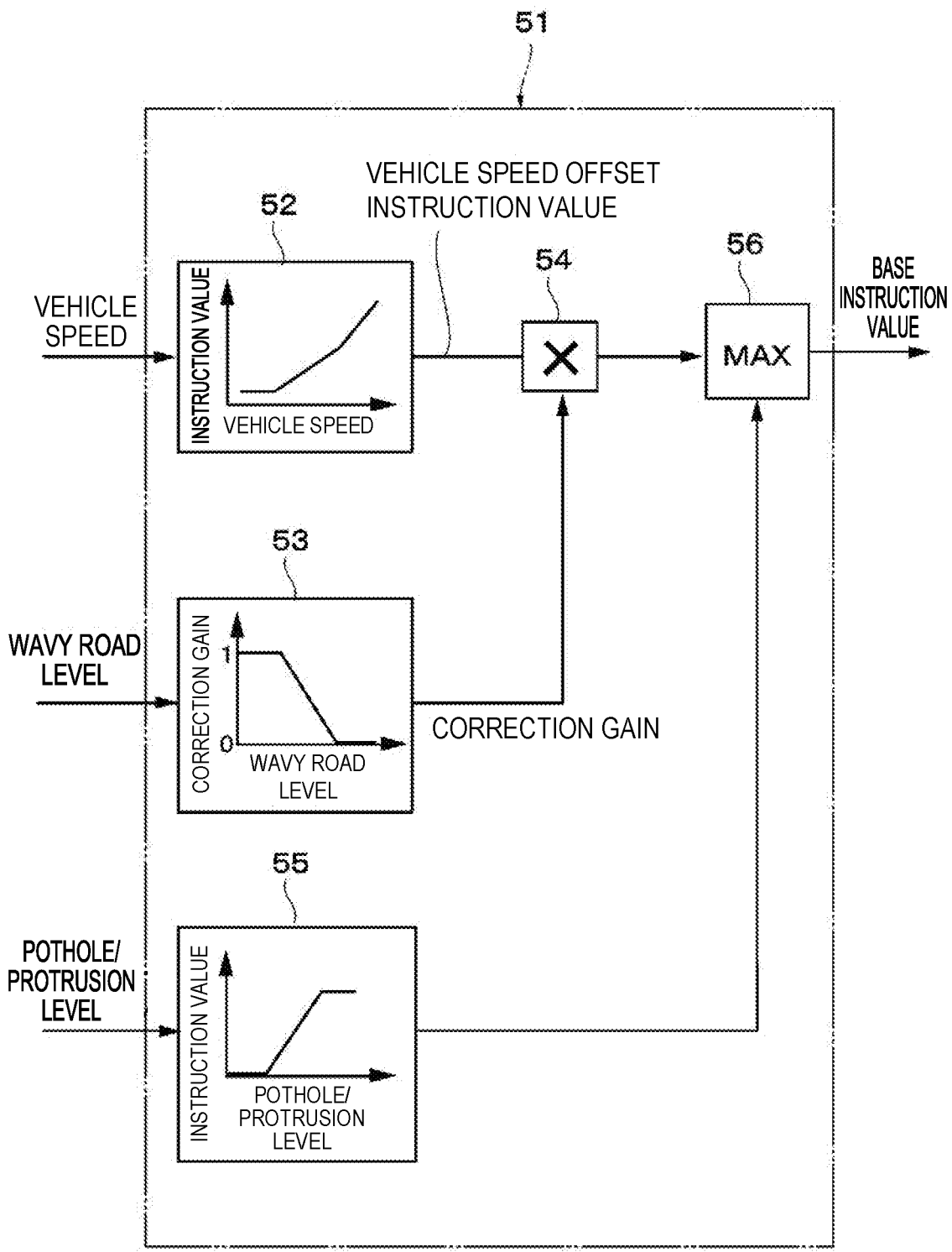
FIG. 7 is a control block diagram illustrating a specific example of control by a base control portion according to a second modification.

Further, in the above-described embodiment, the vehicle behavior control apparatus determines the pothole, the large protrusion, the wavy road, or another state as the result of the determination about the road surface based on the wavy road level and the result of the detection of the pothole or the large protrusion. However, the present invention is not limited thereto, and the vehicle behavior control apparatus may define the wavy road level and the pothole/projection detection as continuous levels (degrees) to set the base instruction value according to respective values thereof, and determine the base instruction value by selecting a maximum value among them, like, for example, a second modification illustrated in FIG. 7. In the second modification illustrated in FIG. 7, a base control portion 51 includes a vehicle speed offset instruction value calculation portion 52, a correction gain calculation portion 53, a multiplication portion 54, a pothole/protrusion level calculation portion 55, and a maximum value calculation portion 56.

The base control portion 51 is configured approximately similarly to the base control portion 15 described in the above-described embodiment, but is different therefrom in terms of including the correction gain calculation portion 53, the multiplication portion 54, the pothole/protrusion level calculation portion 55, and the maximum value calculation portion 56. Further, the vehicle speed offset instruction value calculation portion 52 is configured similarly to the vehicle speed offset instruction value calculation portion 27 described in the above-described embodiment. The correction gain calculation portion 53 calculates a correction gain so as to reduce the control gain according to the wavy road level, and the multiplication portion 54 multiplies the vehicle speed offset instruction value from the vehicle speed offset instruction value calculation portion 52 by this correction gain. The pothole/protrusion level calculation portion 55 calculates the instruction value according to the pothole/protrusion level. The maximum value calculation portion 56 selects as the a base instruction value an instruction value corresponding to a larger value from the instruction value calculated by the multiplication portion 54 and the instruction value calculated by the pothole/protrusion level calculation portion 55.

Further, in the above-described embodiment, the vehicle behavior control apparatus has been described assuming that the force generation mechanism, which generates the adjustable force between the vehicle body 1 side and the wheel 2 side, is constructed with use of the variable damper 6 realized by the damping force adjustable hydraulic shock absorber. However, the present invention is not limited thereto, and the force generation mechanism may be constructed with use of, for example, an air suspension, a stabilizer (a kinetic suspension), an electromagnetic suspension, or the like, besides the hydraulic shock absorber.

Further, in the above-described embodiment, the vehicle behavior control apparatus has been described referring to the vehicle behavior control apparatus for use in the four-wheeled automobile by way of example. However, the present invention is not limited thereto, and the vehicle behavior control apparatus may be applied to, for example, a two-wheeled or three-wheeled automobile, or a truck, bus, or the like, which is a service vehicle or a transporter vehicle.

Next, configurations possible as the vehicle behavior control apparatus included in the above-described embodiment include the following examples.

According to a first configuration, a vehicle behavior control apparatus includes a force generation mechanism provided between a vehicle body side and a wheel side of a vehicle and configured to generate an adjustable force between these sides, a road surface state detection portion configured to be able to detect a road surface state ahead of the vehicle as a feedforward road surface state value, a vehicle body behavior information calculation portion configured to detect or estimate a state of a behavior of a vehicle body of the vehicle and calculate behavior information of the vehicle body as a feedback road surface state value, and a generation mechanism control portion configured to determine a value to be generated by the force generation mechanism based on the value of the vehicle body behavior information calculation portion and output an instruction signal therefor to the force generation mechanism. The generation mechanism control portion includes a base control portion configured to determine a lower limit value on the instruction signal. The lower limit value serves as a lower limit on the force to be generated by the force generation mechanism. The generation mechanism control portion corrects the lower limit value on the instruction signal that is determined by the base control portion based on a result of the detection by the road surface state detection portion.

According to a second configuration of the vehicle behavior control apparatus, in the above-described first configuration, the base control portion performs control at least based on a running speed of the vehicle. According to a third configuration of the vehicle behavior control apparatus, in the above-described first configuration, the generation mechanism control portion compares the feedforward road surface state value detected by the road surface state detection portion and the feedback road surface state value detected by the vehicle body behavior information calculation portion, and uses a higher state value as an input value of the generation mechanism control portion. In this manner, the vehicle behavior control apparatus calculates the waviness road level with use of both the feedforward road surface state value according to the road surface preview information from the road surface state detection portion and the feedback road surface state value from the vehicle body behavior information calculation portion, thereby being able to enhance determinability since before the vehicle passes through the road surface until the vibration is stopped, thereby further improve the ride comfort performance.

According to a fourth configuration of the vehicle behavior control apparatus, in the above-described first or second configuration, when the road surface state detection portion determines that the road surface lying ahead of the vehicle is a pothole, the vehicle behavior control apparatus increases the instruction signal for the force to be generated by the force generation mechanism that is controlled by the base control portion. Due to this configuration, the vehicle behavior control apparatus performs control of increasing the damping force when detecting the pothole based on the preview road surface information. As a result, the vehicle behavior control apparatus can damp the vibration and prevent the force generation mechanism from reaching full extension or full compression.

According to a fifth configuration of the vehicle behavior control apparatus, in the above-described first or second configuration, when the road surface state detection portion determines that the road surface lying ahead of the vehicle is a wavy road, the vehicle behavior control apparatus reduces the instruction signal for the force to be generated by the force generation mechanism that is controlled by the base control portion. According to a sixth configuration of the vehicle behavior control apparatus, in the above-described first or second configuration, when the road surface state detection portion determines that the road surface lying ahead of the vehicle is a wavy road, the generation mechanism control portion issues the instruction signal for reducing a control gain.

According to a seventh configuration of the vehicle behavior control apparatus, in the above-described first configuration, when correcting the lower limit value on the instruction signal that is determined by the base control portion based on the result of the detection by the road surface state detection portion, the vehicle behavior control apparatus increases the instruction signal to be output by the generation mechanism control portion. Due to this configuration, the vehicle behavior control apparatus can increase the gain to bring about the vibration damping effect when detecting the wavy road based on the preview road surface information.

The present invention is not limited to the above-described embodiment, and includes various modifications. For example, the above-described embodiment has been described in detail to facilitate better understanding of the present invention, and the present invention is not necessarily limited to the configuration including all of the described features. Further, a part of the configuration of some embodiment can be replaced with the configuration of another embodiment, and some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2017-033353 filed on Feb. 24, 2017. The entire disclosure of Japanese Patent Application No. 2017-033353 filed on Feb. 24, 2017 including the specification, the claims, the drawings, and the abstract is incorporated herein by reference in its entirety.

REFERENCE SIGN LIST 1 vehicle body
2 wheel
3 vehicle speed sensor
4 suspension device
6 variable damper (force generation mechanism)
7 damping force variable actuator
8 camera device (road surface state detection portion)
9 vehicle height sensor (vehicle body behavior information calculation portion)
10 controller (generation mechanism control portion)
11 road surface estimation portion
15, 41, 51 base control portion (base control portion)

The invention claimed is:

1. A vehicle behavior control apparatus comprising:
a force generation mechanism provided between a vehicle body side and a wheel side of a vehicle and configured to generate an adjustable force between the vehicle body side and the wheel side;
a road surface state detection portion configured to be able to detect a road surface state ahead of the vehicle as a feedforward road surface state value;
a vehicle body behavior information calculation portion configured to detect or estimate a state of a behavior of a vehicle body of the vehicle and calculate behavior information of the vehicle body as a feedback road surface state value; and
a generation mechanism control portion configured to determine a value to be generated by the force generation mechanism based on the value of the vehicle body behavior information calculation portion and output an instruction signal therefor to the force generation mechanism,
wherein the generation mechanism control portion includes a base control portion configured to determine a lower limit value on the instruction signal, the lower limit value serving as a lower limit on the force to be generated by the force generation mechanism,
wherein the generation mechanism control portion corrects the lower limit value on the instruction signal that is determined by the base control portion based on a result of the detection by the road surface state detection portion, and
wherein the generation mechanism control portion compares the feedforward road surface state value detected by the road surface state detection portion and the feedback road surface state value detected by the vehicle body behavior information calculation portion, and uses a higher state value as an input value of the generation mechanism control portion.

2. The vehicle behavior control apparatus according to claim 1, wherein the base control portion performs control at least based on a running speed of the vehicle.

3. The vehicle behavior control apparatus according to claim 1, wherein, when the road surface state detection portion determines that the road surface lying ahead of the vehicle is a wavy road, the vehicle behavior control apparatus reduces the instruction signal for the force to be generated by the force generation mechanism that is controlled by the base control portion.

4. The vehicle behavior control apparatus according to claim 1, wherein, when the road surface state detection portion determines that the road surface lying ahead of the vehicle is a wavy road, the generation mechanism control portion issues the instruction signal for reducing a control gain.

5. A vehicle behavior control apparatus comprising:
a force generation mechanism provided between a vehicle body side and a wheel side of a vehicle and configured to generate an adjustable force between the vehicle body side and the wheel side;
a road surface state detection portion configured to be able to detect a road surface state ahead of the vehicle as a feedforward road surface state value;
a vehicle body behavior information calculation portion configured to detect or estimate a state of a behavior of a vehicle body of the vehicle and calculate behavior information of the vehicle body as a feedback road surface state value; and
a generation mechanism control portion configured to determine a value to be generated by the force generation mechanism based on the value of the vehicle body behavior information calculation portion and output an instruction signal therefor to the force generation mechanism,
wherein the generation mechanism control portion includes a base control portion configured to determine a lower limit value on the instruction signal, the lower limit value serving as a lower limit on the force to be generated by the force generation mechanism,
wherein the generation mechanism control portion corrects the lower limit value on the instruction signal that is determined by the base control portion based on a result of the detection by the road surface state detection portion, and
wherein, when the road surface state detection portion determines that the road surface lying ahead of the vehicle is a pothole, the vehicle behavior control apparatus increases the instruction signal for the force to be generated by the force generation mechanism that is controlled by the base control portion.

6. A vehicle behavior control apparatus comprising:
a force generation mechanism provided between a vehicle body side and a wheel side of a vehicle and configured to generate an adjustable force between the vehicle body side and the wheel side;
a road surface state detection portion configured to be able to detect a road surface state ahead of the vehicle as a feedforward road surface state value;
a vehicle body behavior information calculation portion configured to detect or estimate a state of a behavior of a vehicle body of the vehicle and calculate behavior information of the vehicle body as a feedback road surface state value; and
a generation mechanism control portion configured to determine a value to be generated by the force generation mechanism based on the value of the vehicle body behavior information calculation portion and output an instruction signal therefor to the force generation mechanism,
wherein the generation mechanism control portion includes a base control portion configured to determine a lower limit value on the instruction signal, the lower limit value serving as a lower limit on the force to be generated by the force generation mechanism,
wherein the generation mechanism control portion corrects the lower limit value on the instruction signal that is determined by the base control portion based on a result of the detection by the road surface state detection portion, and
wherein, when correcting the lower limit value on the instruction signal that is determined by the base control portion based on the result of the detection by the road surface state detection portion, the vehicle behavior control apparatus increases the instruction signal to be output by the generation mechanism control portion.

* * * * *